Dec. 6, 1955 W. A. RAY 2,726,359
DIRECTIONAL MULTIPOSITION MOTOR CONTROL
Filed July 6, 1951
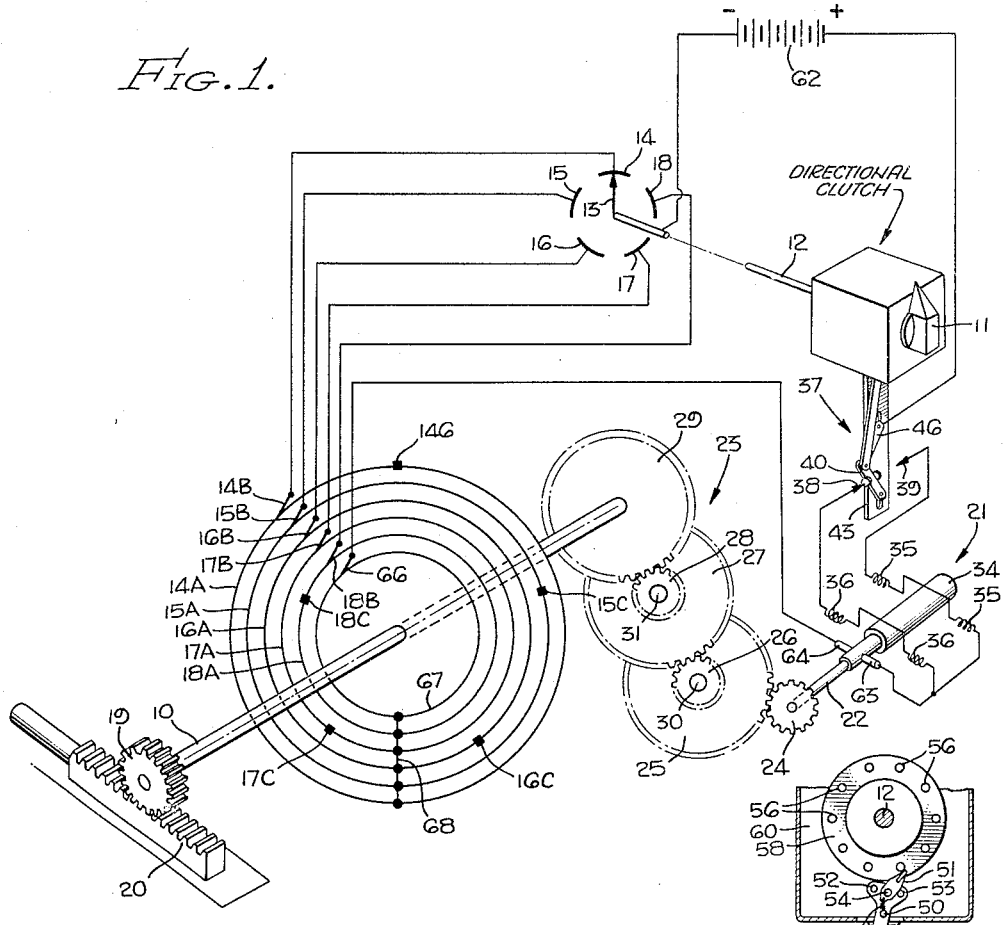
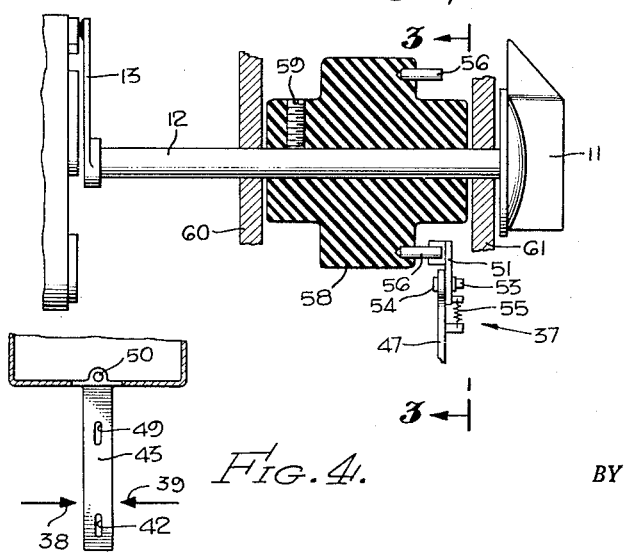
WILLIAM A. RAY,
INVENTOR.
BY Lyon & Lyon
ATTORNEYS United States Patent Office 2,726,359
Patented Dec. 6, 1955

2,726,359

DIRECTIONAL MULTIPOSITION MOTOR CONTROL

William A. Ray, North Hollywood, Calif., assignor to General Controls Co., Glendale, Calif., a corporation of California Application July 6, 1951, Serial No. 235,421

5 Claims. (Cl. 318—33)

The present invention relates to an improved control system wherein it is desired that the rotation of a manually operable control knob, which is rotatable either in the clockwise or counterclockwise direction at all times, should produce rotation of a member controlled by said knob and corresponding to the rotational direction of said knob.

It is therefore an object of the present invention to provide an improved control system which is capable of accomplishing the result indicated in the preceding paragraph.

A specific object of the present invention is to provide an improved follow-up control system which incorporates a shaft which is driven at all times in a direction corresponding to the rotational direction of a manually operable control knob in those instances where the control knob at will may be rotated either in the clockwise or counterclockwise direction.

Another specific object of the present invention is to provide an improved control system of this character which includes follow-up arrangement incorporating a directional two-position switch, the switch being in either one of its two actuated positions depending upon whether an associated control knob is being rotated either clockwise or counterclockwise.

While the present invention is described in relationship to the control of a slidable valve element in a hydraulic control system it is apparent that the invention in its broader aspects is not limited to use in such hydraulic control system, but may be used in other systems wherein the above-mentioned results are desired.

A specific object of the present invention, however, is to provide an improved control for alternating the position of a movable slide valve where it is desired to have the slide valve assume different operating positions in accordance with the direction in which the operator rotates a control knob. Thus, if the operator turns the knob clockwise, a motor-operated shaft coupled to such slide valve likewise at all times should turn clockwise and not in any case counterclockwise.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 represents, partly in schematic form and partly in structural form, apparatus embodying features of the present invention;

Figure 2 is a view corresponding to a longitudinal sectional view through the direction clutch or switch actuating element in Figure 1; and Figure 3 is a view taken in the direction indicated by the line 3—3 of Figure 2.

Figure 4 is a view similar to Figure 3 for purposes of showing the lost motion slots in the bracket 43.

In accordance with important features of the present invention, the motor driven shaft 10 is rotated to different adjusted angular positions which correspond to different angular positions to which the rotatable control knob 11 is manually rotated. An important feature of the present invention resides in the provisions of the means in the control system whereby the shaft 10 in the process of being moved from one angular position to a different adjusted angular position rotates in the same corresponding direction as the rotatable control knob 11.

The control knob 11 affixed to the shaft 12 is free to be rotated either clockwise or counterclockwise as the operator desires and, correspondingly, the motor driven shaft 10 is rotated in the same corresponding direction, namely, clockwise or counterclockwise, as the case may be.

The control knob 11 is affixed to one end of the shaft 12, the other end of such shaft 12 having affixed thereto the switch contact element 13 which cooperates with the five equally circumferentially spaced stationary switch contacts 14, 15, 16, 17 and 18. These stationary switch contacts are connected respectively to rotatable rings 14A, 15A, 16A, 17A and 18A through corresponding brushes 14B, 15B, 16B, 17B and 18B. Each of these rotatable conducting rings 14A, 15A, 16A, 17A and 18A, however, are split with insulation 14C, 15C, 16C, 17C and 18C, respectively, between the slit ends of such rings. The insulation 14C, 15C, 16C, 17C and 18C, in the manner described in detail hereinafter, serves to interrupt the flow of current which may be caused by movement of the switch element 13 thereby to determine the angular rest position of the shaft 10 on which is mounted each one of the rings 14A, 15A, 16A, 17A and 18A. It is observed that the insulation 14C, 15C, 16C, 17C and 18C is separated in equal angular distances with respect to rotation of the shaft 10. Such angular distance of separation of the insulation 14C, 15C, 16C, 17C and 18C corresponds in magnitude, of course, to the angular spacing of the stationary switch contacts 14, 15, 16, 17 and 18.

The shaft 10 has affixed to one end thereof a pinion gear 19 meshing with a slidable rack bar 20 to which may be attached, for example, a slide valve in a hydraulic control system.

The shaft 10 is driven by the reversible motor 21. The motor 21 has its output shaft 22 coupled to the shaft 10 through conventional speed reduction gear 23, which includes in Figure 1 the intermeshed gears 24, 25, 26, 27, 28 and 29. The gear 24 is affixed to the shaft 22; the gears 25 and 26 are rotatably mounted for movement as a unit about the same common axle 30; the gears 27 and 28 are rotatably mounted for movement as a unit about the same common axle 31; while the gear 29 is affixed to the shaft 10.

The motor 21 includes the shaft 22 on which the armature 34 for magnetic interaction with either one of the reversed wound fields 35, 36. Briefly, the field 36 is energized when it is desired to rotate the shaft 22 in one direction; to produce rotation of the shaft 22 in the opposite direction the field 36 is de-energized and the other field 35 is energized.

In accordance with important features of the present invention, either field 35 or field 36 is energized, depending upon the direction in which the operator rotates the control knob 11. To achieve that purpose a directional switch 37 is provided. This switch 37 is an over-center trigger switch which under static conditions is always in either one of its two switch-closing positions. The switch 37 is essentially a single pole, double throw switch as seen in Figure 3 with spaced stationary contacts 38, 39 and movable switch element 40 in the form of a pivoted link. The link 40 is provided at its lower end with a pin 41 which passes through a lost motion slot 42 in the stationary bracket 43. A prestressed tension spring 44 has one of its ends connected to the bracket 43 and the other one of its ends connected to the link 40. The upper end of the link 40 is pin-connected to one end of the link 46 and lever 47. The other end of the link 46 is provided with a transversely extending pin 48 which passes through the lost motion slot 49 in the stationary bracket 43. The lost motion slot 49 is of the same configuration as the lost motion slot 42.

The lever 47, at a point intermediate its ends, is pivoted about the stationary pivot pin 50. The upper end of the lever 47 has pin-connected thereto a small spring-biased pawl 51, which is movable between the spaced stop pins 52, 53 on the lever 47. The pawl 51 is pivoted about the pin 54 on the lever 47 and is biased by the prestressed tension spring 55 having one of its ends attached to the pawl 51 and the other one of its ends attached to the pin 50. The pawl 51 is adapted to engage the series of pins 56, which extend outwardly of the collar 58 of the insulating material. The collar 58, as shown in Figure 2, is affixed to the shaft 12 by means of the set screw 59 and such shaft 12 is journaled for rotation in the stationary spaced walls 60, 61.

From the foregoing, it is evident that rotation of the shaft 12 in the counterclockwise direction in Figure 3 will result merely in movement of the pawl 51 without movement of the switch element 40; however, when the shaft 12 is rotated in the clockwise direction the pawl 51 is engaged by a pin 56 and, in such case, the pawl 51 is moved into engagement with the stop pin 52. Further clockwise rotational movement of the shaft 12 results in pivoting of the lever 47 and movement of the switch element 40 into engagement with the other stationary switch contact 39.

The motor 21 is energized with current from the voltage source 62, which has one of its terminals connected to the stationary switch contact 13 and the other one of its terminals connected to the switch element 40. The stationary contacts 38, 39 are connected respectively to one terminal of the field windings 35, 36, the other terminals of such field windings 35, 36 being each connected to one of the armature brushes 63. The other armature brush 64 is connected to the brush 66, which rides on the continuous slip ring 67. The continuous slip ring 67 is interconnected with each one of the split slip rings 14A, 15A, 16A, 17A and 18A by means of the conductor 68.

It is observed that in the position of the switches shown in Figure 1, an energizing current for the motor 21 flows in the following path: Such current flows from the positive terminal of the voltage source 62 through the switch 40, 38, through the field windings 36, through the armature 34 to the brush 66, through the conductor 68 to the slip ring 14A and brush 14B. The current entering the brush 14B flows through the switch 14, 13, to the negative terminal of the source 62, thereby completing the current path. The current flows in such path until the brush 14B engages the sector of insulating material 14C, in which case the motor 21 is de-energized and the shaft 10 ceases to rotate.

Assuming one such rest or equilibrium condition is attained, the operator moves the control knob 11 in a counterclockwise direction (to cause the shaft 12 in Figures 1 and 3 to move in counterclockwise direction) so as to move the contact 13 from segment 14 to segment 17. The motor 21 is again energized and remains energized until the brush 17B engages the segment 17C of insulating material. Under this condition the switch 37 remains in its position shown in Figure 3 so as to assure a predetermined rotational direction of movement of the shaft 10. However, if the operator, instead of rotating the shaft 12 counterclockwise, rotates the shaft 12 clockwise for the aforementioned purpose of moving the switch contact 13 into engagement with sector 17, then in this latter case the switch 37 is actuated and the rotational direction of shaft 10 is in the opposite direction, but such shaft 10 ceases its rotation as before upon engagement of the brush 17B with the sector of insulation 17C.

It is obvious to those skilled in the art that while the reversible motor 21 is shown specifically herein as of the D. C. or continuous current type, an alternating current motor may be used for the same purpose. In such case the source 62 is an alternating current source.

Further, means other than the sectors of insulating material 14C, 15C, 16C, 17C and 18C may be used for de-energizing the motor 21, either of the A. C. or D. C. type, upon the shaft 10 assuming a predetermined angular position. Such other means, as is well known in the art, may comprise cam operated switches opening at the selected positions.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a control system of the character described, a control shaft, a manually operable control knob on said shaft for rotating said shaft either in the clockwise or counter-clockwise direction, a positioning switch operated upon rotation of said shaft, a directional clutch on said shaft interpositioned between said control knob and said positioning switch, a control element, a reversible motor having an input shaft coupled to said control element for positioning the same in predetermined positions, said motor having a first field winding associated therewith for moving said control element in said first direction and having a second field winding associated therewith for moving said element in the opposite direction, switching means operated in accordance with the position of said control element, a snap-acting switch having a control member and associated with said first and second field windings for alternately energizing the same in a serial circuit which includes said snap-acting switch, said positioning switch and said switching means, said directional clutch interpositioned between said control knob and said positioning switch and effective to operate said snap-acting switch only upon reverse movement of said control knob.

2. In a control system of the character described, a manually operable control knob rotatable either in the clockwise or counterclockwise direction, a control element, a reversible motor having an output shaft coupled to said control element for positioning the same in predetermined positions, said motor having a first field winding associated therewith for moving said control element in a first direction and having a second field winding associated therewith for moving said element in the opposite direction, a positioning switch operated by said knob, switching means operated in accordance with the position of said control element, a snap-acting switch having a control member and associated with said first and second field windings for alternately energizing the same in a serial circuit which includes said snap-acting switch, said positioning switch, and said switching means, and means coupling said control knob to said snap-acting switch for actuating the same only upon reverse movement of said control knob, the last mentioned means including a one-way clutch mechanically interconnected between said control knob and said snap-acting switch with said clutch being effective to operate said switch only upon reverse movement of said knob.

3. In a control system of the character described, a manually operable control knob rotatable either in the clockwise or counterclockwise direction, a control element, a reversible motor having an output shaft coupled to said control element for positioning the same in predetermined positions, said motor having a first field winding associated therewith for moving said control element in a first direction and having a second field winding associated therewith for moving said element in the opposite direction, a positioning switch operated by said knob, switching means operated in accordance with the position of said control element, a snap-acting switch having a control member and associated with said first and second field windings for alternately energizing the same in a serial circuit which includes said snap-acting switch, said positioning switch, and said switching means, and means coupling said control knob to said snap-acting switch for actuating the same only upon reverse movement of said control knob, the last mentioned means including a pawl-operated mechanism mechanically interposed between said control knob and said snap-acting switch for operating said switch only upon reverse movement of said knob.

4. In a control system of the character described, a manually operable control knob rotatable either in the clockwise or counterclockwise direction, a control element, a reversible motor having an output shaft coupled to said control element for positioning the same in predetermined positions, said motor having a first field winding associated therewith for moving said control element in a first direction and having a second field winding associated therewith for moving said element in the opposite direction, a positioning switch operated by said knob, switching means operated in accordance with the position of said control element, a snap-acting switch having a control member and associated with said first and second field windings for alternately energizing the same in a serial circuit which includes said snap-acting switch, said positioning switch, and said switching means, and means coupling said control knob to said snap-acting switch for actuating the same only upon reverse movement of said control knob, the last mentioned means including a directional clutch having a pawl-operated member with a cooperating associated actuating member therefor interposed between said control knob and said snap-acting switch for operating said switch only upon reverse movement of said knob, said snap-acting switch being a single-pole double-throw switch having opposite stationary contacts thereof connected to a corresponding one of said first and second field windings, and the movable contact of said snap-acting switch being serially connected with said positioning switch and said switching means.

5. In a control system of the character described, a manually operable control knob rotatable either in the clockwise or counterclockwise direction, a control element, a reversible motor having an output shaft coupled to said control element for positioning the same in predetermined positions, said motor having a first field winding associated therewith for moving said control element in a first direction and having a second field winding associated therewith for moving said element in the opposite direction, a positioning switch operated by said knob, switching means operated in accordance with the positioning of said control element, a snap-acting switch having a control member and associated with said first and second field windings for alternately energizing the same in a serial circuit which includes said snap-acting switch, said positioning switch, and said switching means, and means coupling said control knob to said snap-acting switch for actuating the same only upon reverse movement of said control knob, said snap-acting switch comprising a single-pole, double-throw switch having opposite stationary contacts thereon connected to a corresponding one of said first and second field windings, and the movable contact of said snap-acting switch being serially connected with said positioning switch and said switching means.

References Cited in the file of this patent

UNITED STATES PATENTS

| | | |
|---|---|---|
| 2,383,338 | Newman | Aug. 21, 1945 |
| 2,422,448 | Trible | June 17, 1947 |
| 2,436,068 | Hegy | Feb. 17, 1948 |
| 2,553,069 | Unk et al. | May 15, 1951 |